United States Patent
Nagai et al.

(10) Patent No.: US 8,695,172 B2
(45) Date of Patent: Apr. 15, 2014

(54) HOSE CLAMP

(75) Inventors: Takao Nagai, Kanagawa (JP); Takeaki Tanaka, Kanagawa (JP)

(73) Assignee: Piolax, Inc., Yokohama-Shi, Kanagawa (JP)

( * ) Notice: Subject to any disclaimer, the term of this patent is extended or adjusted under 35 U.S.C. 154(b) by 0 days.

(21) Appl. No.: 13/395,868

(22) PCT Filed: Sep. 1, 2010

(86) PCT No.: PCT/JP2010/064899
§ 371 (c)(1),
(2), (4) Date: Mar. 13, 2012

(87) PCT Pub. No.: WO2011/033932
PCT Pub. Date: Mar. 24, 2011

(65) Prior Publication Data
US 2012/0159743 A1 Jun. 28, 2012

(30) Foreign Application Priority Data
Sep. 18, 2009 (JP) .................................. 2009-218024

(51) Int. Cl.
*F16L 33/10* (2006.01)
(52) U.S. Cl.
USPC .......................... 24/20 R; 24/23 R; 24/20 EE
(58) Field of Classification Search
USPC ....... 24/20 R, 22, 23 W, 23 R, 20 CW, 20 TT, 24/20 EE, 20 S
See application file for complete search history.

(56) References Cited

U.S. PATENT DOCUMENTS

| 4,930,192 | A | * | 6/1990 | Muhr ............................ | 24/20 R |
| 5,414,905 | A | * | 5/1995 | Kimura et al. ................ | 24/20 R |
| 5,542,155 | A | * | 8/1996 | Kimura et al. ................ | 24/20 R |

(Continued)

FOREIGN PATENT DOCUMENTS

| CN | 101400936 A | 4/2009 |
| EP | 0 713 993 B1 | 5/2000 |

(Continued)

OTHER PUBLICATIONS

International Search Report in PCT/JP2010/064899 dated Sep. 28, 2010 (English translation Thereof).

(Continued)

*Primary Examiner* — Robert J Sandy
*Assistant Examiner* — Rowland D Do
(74) *Attorney, Agent, or Firm* — McGinn IP Law Group, PLLC (57) ABSTRACT

A hose clamp includes a plate spring main body, and a slit and a first grip piece are formed at one end portion, while an insertion piece and a second grip piece are formed at the other end portion thereof. A locking piece having a hook-shaped locking portion is formed on the first grip piece via a bent portion, while an engagement holding portion is formed on the second grip piece. Provided on the locking piece are a taper portion which expands from the locking portion towards the bent portion and a stopper portion which extends substantially parallel to the first grip piece. The taper portion is disposed along a plane which is substantially parallel to a circumferential surface of the plate spring main body, and an intersection point between the taper portion and the stopper portion is offset in a width direction relative to the locking portion.

20 Claims, 10 Drawing Sheets

(56) References Cited

U.S. PATENT DOCUMENTS

| | | | | |
|---|---|---|---|---|
| 5,855,044 | A * | 1/1999 | Cradduck | 24/20 R |
| 6,038,744 | A * | 3/2000 | Zielinski | 24/20 R |
| 6,098,251 | A * | 8/2000 | Zielinski | 24/20 R |
| 6,192,555 | B1 * | 2/2001 | Nakamura et al. | 24/20 R |
| 6,343,407 | B1 * | 2/2002 | Muto et al. | 24/20 R |
| 6,438,801 | B1 * | 8/2002 | Yamada | 24/20 R |
| 8,127,406 | B2 * | 3/2012 | Morita | 24/20 R |
| 8,171,603 | B2 * | 5/2012 | Nakamura | 24/20 R |
| 2003/0159255 | A1 * | 8/2003 | Senovich et al. | 24/20 R |
| 2009/0049656 | A1 * | 2/2009 | Morita | 24/20 R |

FOREIGN PATENT DOCUMENTS

| | | |
|---|---|---|
| EP | 1 033 519 B1 | 6/2005 |
| JP | 5-83580 U | 11/1993 |
| JP | 11-118079 A | 4/1999 |
| JP | 2001-159491 A | 6/2001 |
| WO | WO 2007/108155 A1 | 9/2007 |

OTHER PUBLICATIONS

Chinese Office Action with Search Report dated Jun. 4, 2013.

* cited by examiner

HOSE CLAMP

TECHNICAL FIELD

The present invention relates to a hose clamp which is used, for example, for connecting pipes in a motor vehicle to each other by use of a hose.

BACKGROUND ART

When connecting pipes in a motor vehicle together, for example, a flexible hose is placed on an outer circumference of an end portion of a pipe, and an outer circumference of the hose is fastened by a hose clamp, thereby fixing the hose to the pipe.

For example, Patent Literature 1 discloses a hose clamp including a C-shaped plate spring main body (a fastening ring 1) and a pair of grip pieces (one grip 2A and the other grip 2B) which are erected from both end portions of the plate spring main body in a radial direction so as to intersect each other. One grip piece is formed into an arch-shaped wide dimension in which a guide groove is opened, while the other grip piece is formed into a narrow dimension to be movable within the guide groove. When the plate spring main body is in the free state, the plate spring main body is diametrically contracted for fastening the hose. And, by bringing both the grip pieces close to each other, the plate spring main body is diametrically expanded. On the one grip piece, a hook-shaped locking portion (a locking portion 4) for engaging with the other grip piece and a taper portion (a guide portion 5) for guiding the other grip piece when it is disengaged from the locking portion are formed.

By bringing both the grip pieces close to each other in a circumferential direction with a tool such as a pair of pliers, the locking portion of the one grip piece is engaged with the other grip piece, whereby the plate spring main body is held in the diametrically expanded state. The hose clamp in this state is disposed on an outer circumference of a hose. Then, by bringing both the grip pieces further close to each other, the other grip piece is guided by the taper portion to move in a width direction to a position where the other gripping portion is not to be engaged with the locking portion again. By opening the tool in this state, the plate spring main body restores elastically, whereby the hose is fastened and fixed.

RELATED ART LITERATURE

Patent Literature

Patent Literature 1: JP-2001-159491-A

SUMMARY OF THE INVENTION

Problem that the Invention is to Solve

In Patent Literature 1, since both the grip pieces of the hose clamp are formed by bending both the end portions of the plate spring main body in a radially outward direction, the taper portion is also curved in the radially outward direction at its halfway position.

With the above-mentioned curved taper portion, when both the grip pieces are gripped together by the tool, the other grip piece moves along the taper portion of the one grip piece, while the sliding resistance between the taper portion and the other grip piece increases gradually. Both the grip pieces is further gripped until being maximally brought close to each other, and then, the tool is opened to allow the plate spring main body to be diametrically contracted. When the position where the tool is opened varies due to manufacturing variation in hose clamps, sometimes, both the grip pieces may not be sufficiently gripped and may not be maximally brought close to each other. In this case, when the plate spring main body is diametrically contracted, the other grip piece may collide against the locking portion of the one grip piece, so that the tool releasing operation may be interrupted or flaws may be produced in the other grip piece, thereby deteriorating product quality. Alternatively, the other grip piece may be engaged with the locking portion again, so that the plate sprig main body cannot be diametrically contracted.

Further, the other grip piece may stop moving halfway up the taper portion due to the gradually increasing sliding resistance with the taper portion of the one grip piece. Still further, when the other grip piece in this state is forcibly gripped towards the one grip piece with an excessive force, the grip pieces and the plate spring main body may be deformed, and the fastening force given to the hose may be affected.

One object of the invention is to provide a hose clamp in which the other grip piece of a pair of grip pieces can surely move until being disengaged from a locking portion of one grip piece without gripping together both the grip pieces excessively and in which a fastening force can be maintained by preventing the deformation of a plate spring main body.

Means for Solving the Problem

The invention provides a hose clamp having a plate spring main body which is curved into a ring-like shape, wherein one end portion of the plate spring main body includes a slit extending along a circumferential direction, and a first grip piece projecting radially outwards, wherein the other end portion of the plate spring main body includes an insertion piece which is inserted into the slit so as to be slidable in the circumferential direction therewithin, and a second grip piece projecting radially outwards from an end portion of the insertion piece so as to face the first grip piece, wherein the plate spring main body is diametrically contracted when it is in its free state, and by bringing the first grip piece and the second grip piece close to each other from the free state, the plate spring main body is diametrically expanded against its elastic force, wherein the first grip piece includes a locking piece which extends in the circumferential direction from a projection halfway position of the first grip piece towards the second grip piece via a bent portion, the locking piece including a distal end portion which extends in a hook-like fashion in a width direction of the plate spring main body as a locking portion, the locking portion being engageable with one side of the second grip piece which is opposite to the other side facing the first grip piece, wherein the second grip piece includes an engagement holding portion which holds an engagement between the locking portion and the one side of the second piece, wherein the locking portion is offset in the width direction relative to the second grip piece so as not to overlap therewith in the circumferential direction, in the free state where the plate spring main body is diametrically contracted, wherein one side edge of the locking piece, which faces the second grip piece when the locking portion and the second grip piece are engaged, includes a taper portion which extends from the locking portion towards the bent portion while expanding in the width direction of the plate spring main body, and a stopper portion which extends substantially parallel to the first grip piece from a distal end of the taper portion near the bent portion, wherein the taper portion is disposed along a plane which is substantially parallel to a circumferential surface of the plate spring main body, and wherein an intersection point between the taper portion and the stopper portion is offset in the width direction relative to the locking portion.

A bending hole may be formed in the first grip piece at a position lying further distal than an intersection point between the other side edge of the first grip piece and the stopper portion, and the bent portion may be provided near the bending hole.

Advantage of the Invention

According to the invention, from the free state where the plate spring main body is diametrically contracted, by bringing the first grip piece and the second grip piece close to each other against the elastic force of the plate spring main body and by offsetting the locking piece in the width direction, the locking portion thereof is engaged with the engagement holding portion at the opposite side of the second grip piece. Thus, the plate spring main body can be held while being diametrically expanded with both the end portions of the plate spring main body deflected in the width direction.

In this state, the hose clamp is disposed on an outer circumference of a hose which is externally placed on a pipe. Then, by bringing the first grip piece and the second grip piece further close to each other by gripping with a tool such as a pair of pliers or pincers, for example, the engagement held by the engagement holding portion is released, and the second grip piece moves in the width direction by being guided by the taper portion provided on the locking piece to move away from the locking portion until abutting with the stopper portion. When the second grip piece abuts with the stopper portion, a further movement of the second grip piece towards the first grip piece is restricted. In this state, the second grip piece has been moved in the width direction by the taper portion to be surely offset in the width direction relative to the locking portion.

In this state, when the tool is gradually opened so that the second grip piece is allowed to move farther away from the first grip piece, the insertion piece slides within the slit due to the elastic restoring force of the plate spring main body, and the plate spring main body is diametrically contracted. Thus, the hose can be fastened to be fixed to the pipe.

Since the stopper portion is provided on the locking piece so as to be continuous with the taper portion, when bringing both the grip pieces close, the second grip piece is guided by the taper portion to the stopper portion where a further movement of the second grip piece is prevented and the second grip piece can be surely offset in the width direction relative to the locking portion. Therefore, the working person can surely recognize the final position of gripping by the tool, whereby he or she can perform the fastening operation of the hose clamp to the hose in an ensured and safe fashion. Thus, the deformation of the plate spring main body due to excessive gripping by the tool can be prevented to thereby maintain the fastening force of the hose clamp to the hose.

Since the taper portion is disposed along the plane which is substantially parallel to the circumferential surface of the plate spring main body, the sliding resistance between the second grip piece and the taper portion caused when bringing both the grip pieces close to each other is prevented from being increased, and the second grip piece can surely move until abutting with the stopper portion while being guided by the taper portion, thereby facilitating the diametrically contracting work of the plate spring main body.

MODE FOR CARRYING OUT THE INVENTION

Hereinafter, referring to FIGS. 1 to 12, a hose clamp according to an embodiment of the invention will be described. In FIGS. 7 to 12, characteristic portions of this embodiment are shown in solid lines. Should this patent application be changed to a (partial) design application, the portions indicated by the solid lines will be the subjects. Alternate long and short dash lines shown in FIGS. 7 to 12 merely indicate borders between the subject portions and the other portions.

Figure 1:
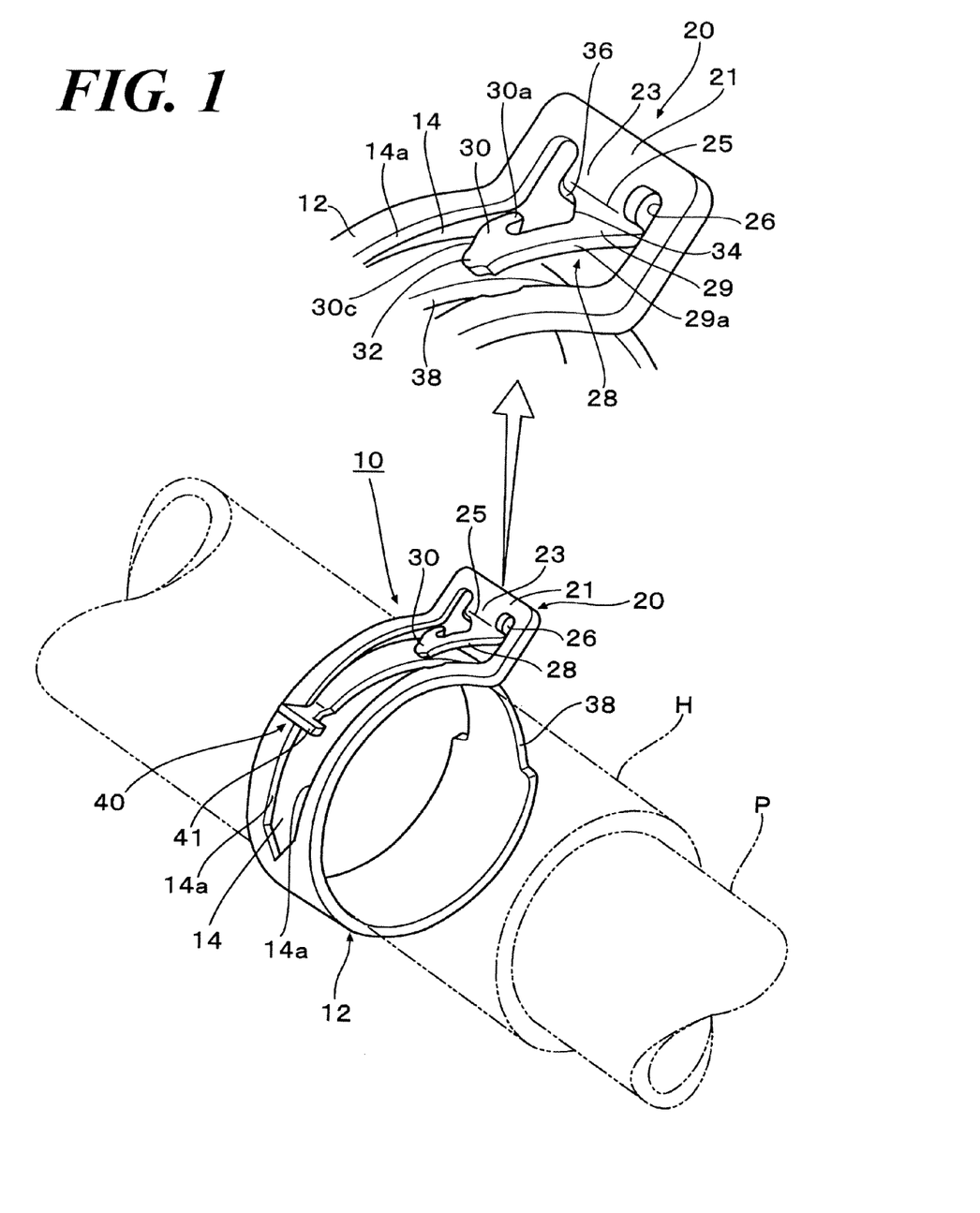
FIG. 1 perspectively illustrates a hose clamp according to an embodiment of the invention, which is in a diametrically contracted state.
Figure 2:
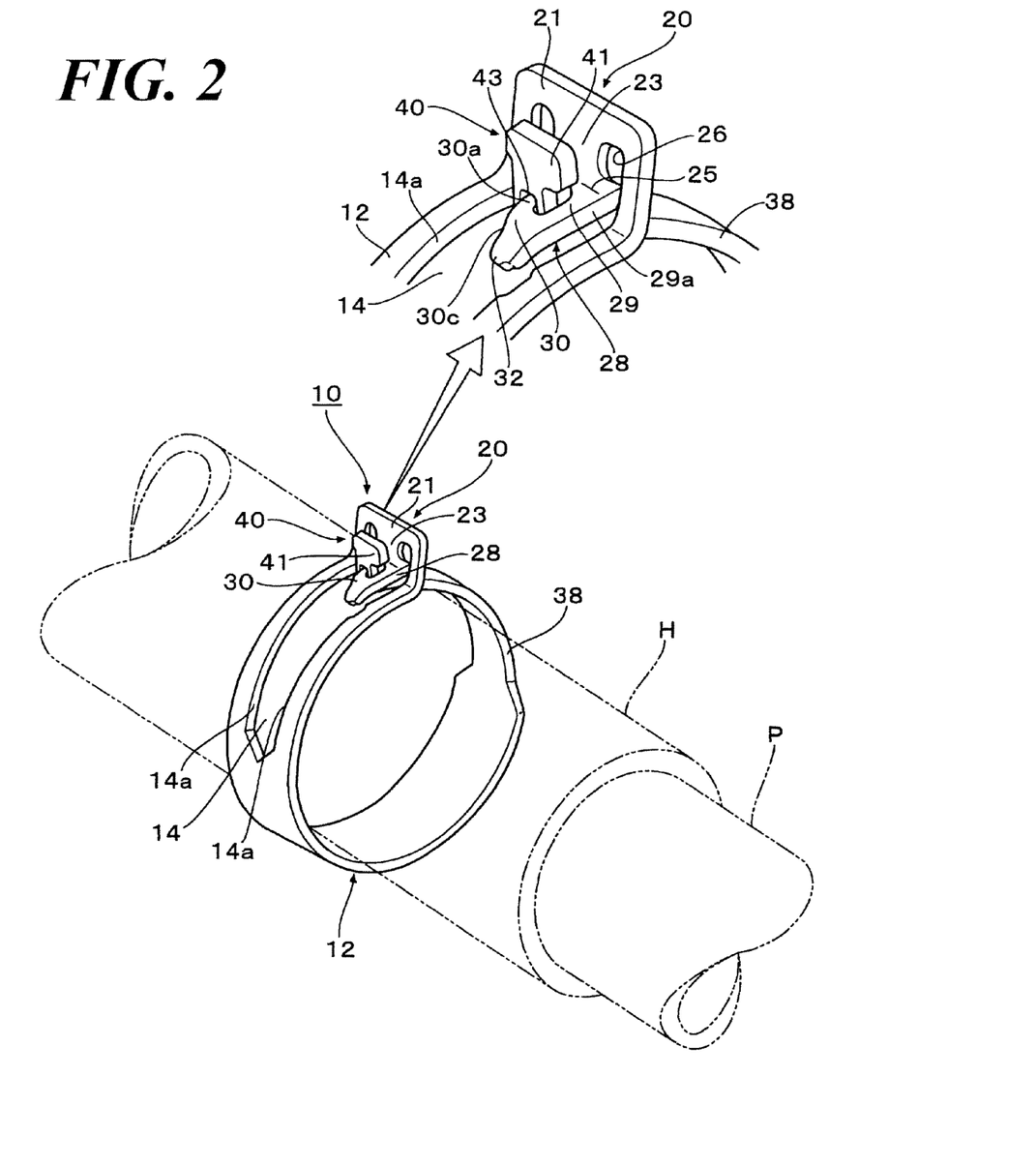
FIG. 2 perspectively illustrates the hose clamp, which is in a diametrically expanded state while a locking piece is engaged with a second grip piece.

As shown in FIGS. 1 and 2, a hose clamp (clamp) 10 of the invention is used to fasten an outer circumference of a hose H which is placed on one end portion of a pipe P (or a tube etc.) so as to fix the hose H to the pipe P.

Figure 3:
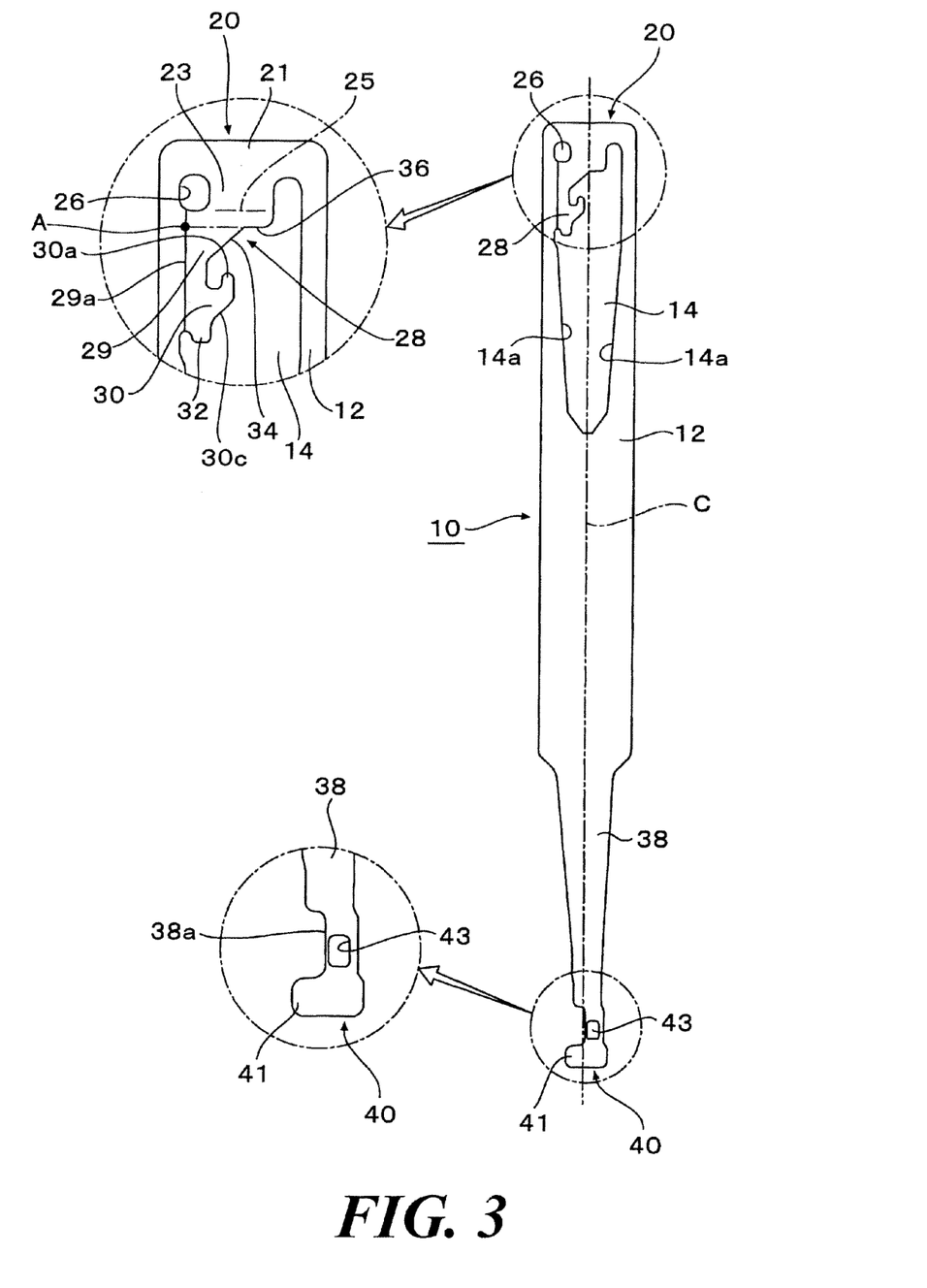
FIG. 3 illustrates the hose clamp in a flatly expanded state.

The clamp 10 in this embodiment is formed by stamping out a metal piece from a band-shaped metal plate with a predetermined shape, and by bending the stamped-out metal piece (refer to FIG. 3). The clamp 10 has a plate spring main body 12. The plate spring main body 12 has a ring-like shape as a result of bending the stamped-out metal piece. A first grip piece 20 is formed at one end portion of the plate spring main body 12, and a second grip piece 40 is formed at the other end portion. Both the grip pieces 20, 40 are formed by bending the respective end portions radially outwards. In the free state, the spring main body 12 is diametrically contracted, so that the first grip piece 20 and the second grip piece 40 spaced away from each other in a circumferential direction (refer to FIG. 1). The plate spring main body 12 can be diametrically expanded by bringing the first grip piece 20 and the second grip piece 40 close to each other in the circumferential direction against the elastic force of the plate spring main body 12, (refer to FIG. 2).

In the one end portion of the plate spring main body 12, a slit 14 of a predetermined length is formed along the circumferential direction. The one end portion of the plate spring main body 12 is bent at a distal end side of the slit 14 so as to project radially outwards, thereby forming the first grip piece 20 to have an arch-like shape. As shown in FIG. 2, both inner side edges 14a, 14a of the slit 14 are tapered so that the width of the slit 14 are widened towards the one end portion of the plate spring main body 12, thereby facilitating the insertion of an insertion piece 38 into the slit 14.

A locking piece 28, which is to be engaged with the second gripping piece 40, is formed on the first gripping piece 20 via a bent portion 25. As shown in FIGS. 1 to 6B, a plate-shaped base portion 23 projects from a lower surface of an arch-shaped upper wall portion 21 of the first grip piece 20, and extends along the first gripping portion 20. The base portion 23 is bent via the bent portion 25 to thereby form the locking piece 28. That is, the locking piece 28 extends from a projection halfway position of the first grip piece 20. As shown in FIG. 1 to 3, a bending hole 26 for facilitating the bending formation of the locking piece 28 is formed in an end portion of the bent portion 25, which intersects with a side edge 29a of an extending portion 29 opposite to a side edge where a taper portion 34 is formed.

The extending portion 29 of the locking piece 28 extends in the circumferential direction from the bent portion 25 towards the second grip piece 40. A distal end portion of the extending portion 29 is extended in a width direction of the plate spring main body 12 to form a hook-like-shaped locking portion 30, which is to be engaged with a side of the second grip piece 40 opposite to a side facing the first grip piece 20. In this embodiment, the extending portion 29 is offset towards one widthwise side portion of the plate spring main body 12, and extends substantially parallel to a circumferential surface of the plate spring main body 12 (refer to FIG. 4B). In this embodiment, what is expressed by "substantially parallel to the circumferential surface of the plate spring main body" means that the extending portion 29 extends while being inclined within a range of ±5° with respect to a tangent to the circumferential surface.

The taper portion 34 and a stopper portion 36 are provided on the side edge of the extending portion 29, which faces the second grip piece 40 when both the grip pieces 20, 40 are brought close in the circumferential direction and the locking portion 30 and the second grip piece 40 are engaged with each other (refer to FIGS. 1, 3, 4A and 4B).

Figure 4A:
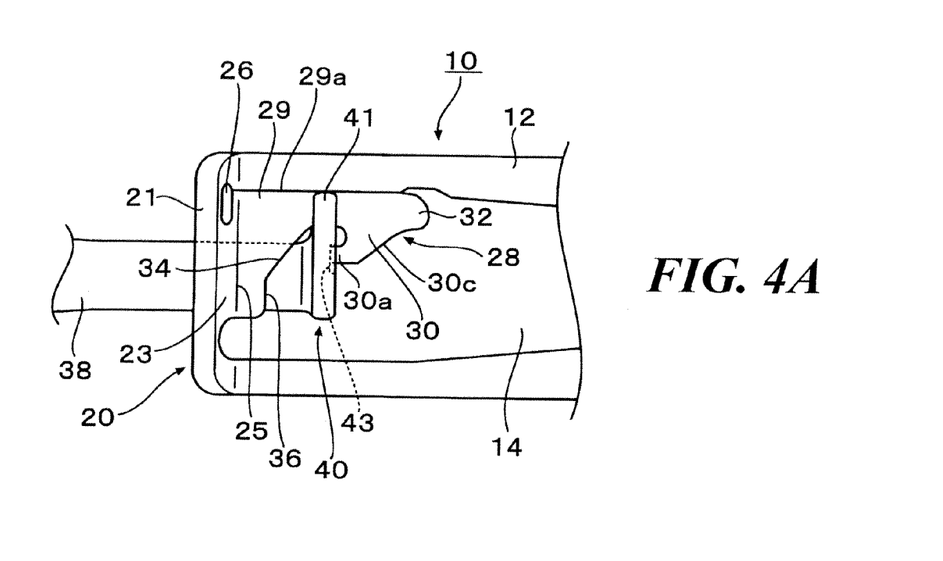
FIGS. 4A and 4B illustrate the hose clamp in a state where the locking piece is engaged with the second grip piece, FIG. 4A being an enlarged plan view, FIG. 4B being an enlarged side view.
Figure 4B:
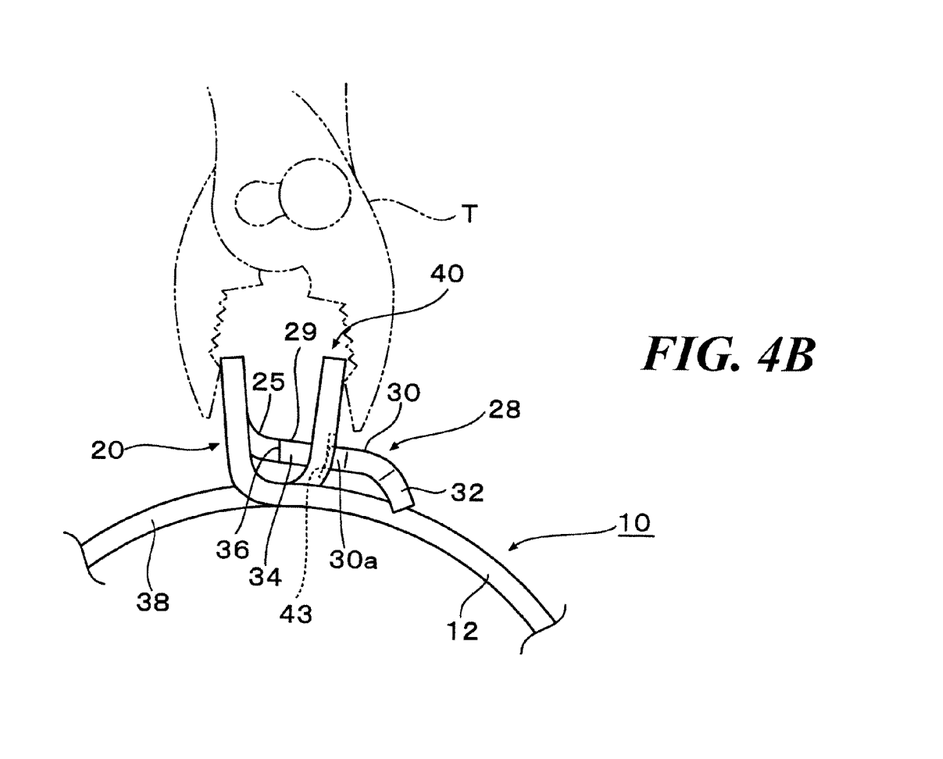

The taper portion 34 extends obliquely from the locking portion 30 side (from a lengthwise halfway position of the extending portion 29) towards the bent portion 25 while expanding in the width direction of the plate spring main body 12. When both the grip pieces 20, 40 are brought close in the circumferential direction, the taper portion 34 guides the second grip piece 40 to move away from the locking portion 30 in the width direction (refer to FIGS. 5A and 5B). As shown in FIGS. 4A and 4B, the taper portion 34 is disposed along a plane which is substantially parallel to the circumferential surface of the plate spring main body 12, that is, disposed inclined within a range of ±5° with respect to a tangent to the circumferential surface. As shown in FIGS. 3, 4A and 4B, when looking at the plate spring main body 12 in a radially inward direction from thereabove, the taper portion 34 extends obliquely as a substantially straight line.

Figure 6A:
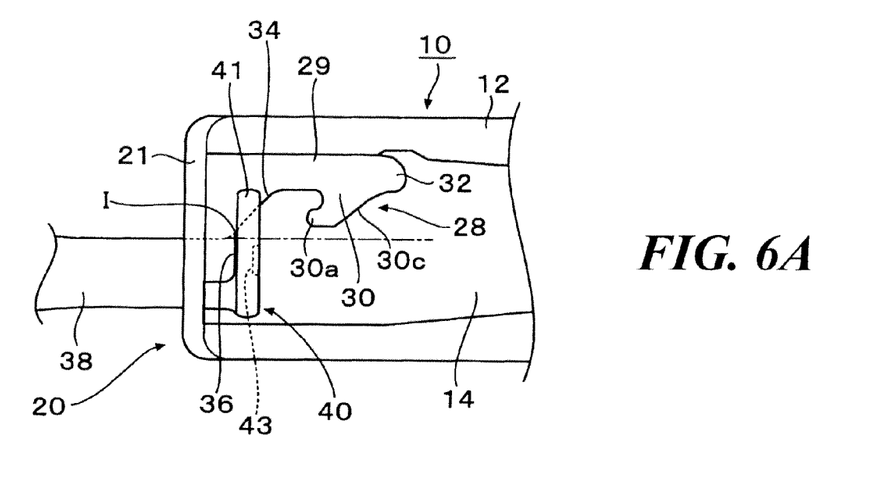
FIGS. 6A and 6B illustrate the hose clamp in a state where the second grip piece moves until abutting with a stopper portion, FIG. 6A being an enlarged plan view, FIG. 6B being an enlarged side view.
Figure 6B:
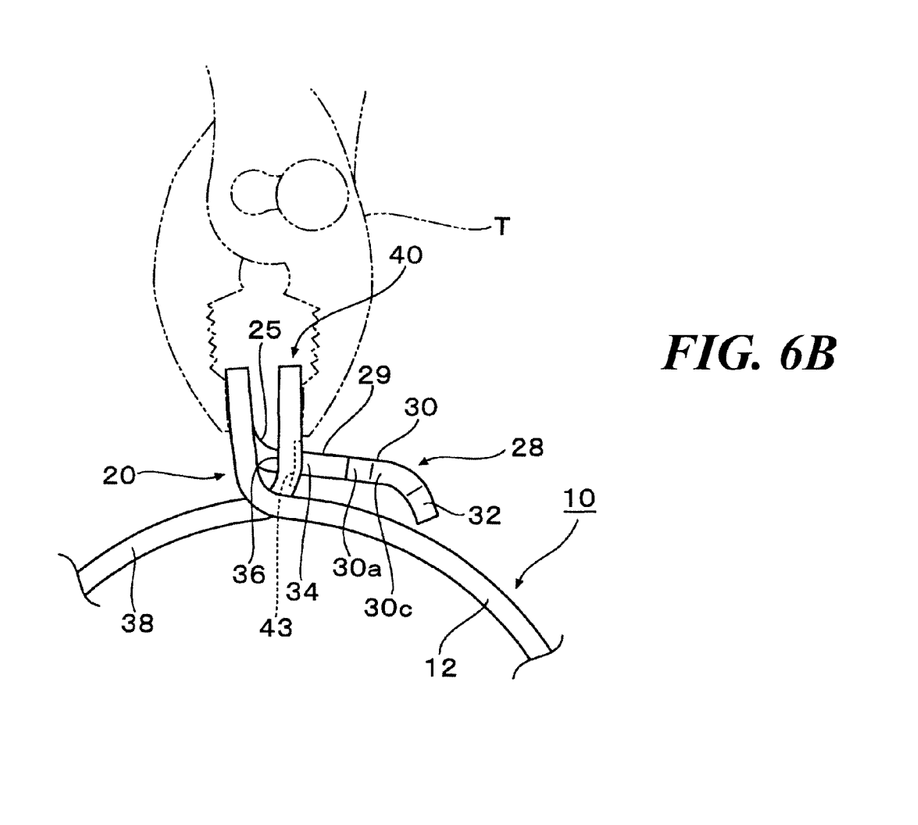
Figure 7:
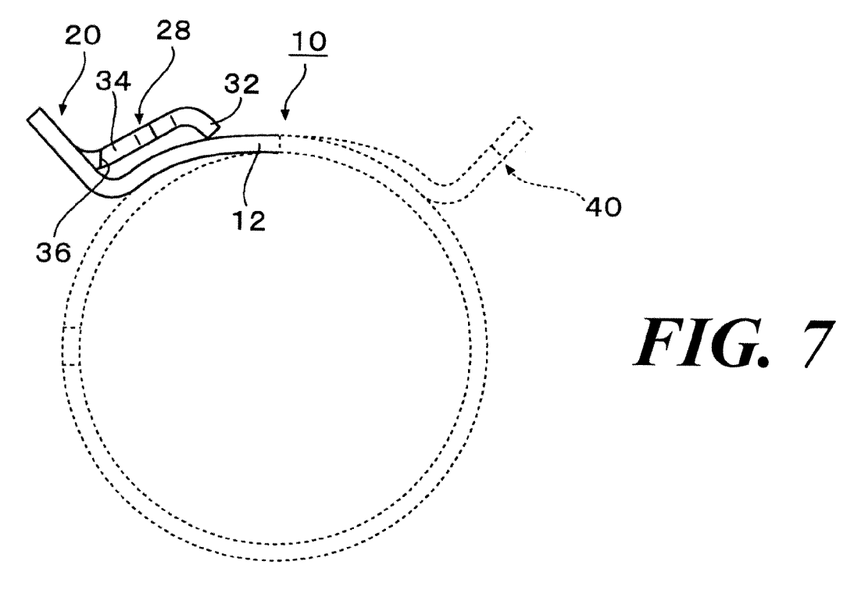
FIG. 7 is a front view of the hose clamp in the diametrically contracted state.
Figure 8:
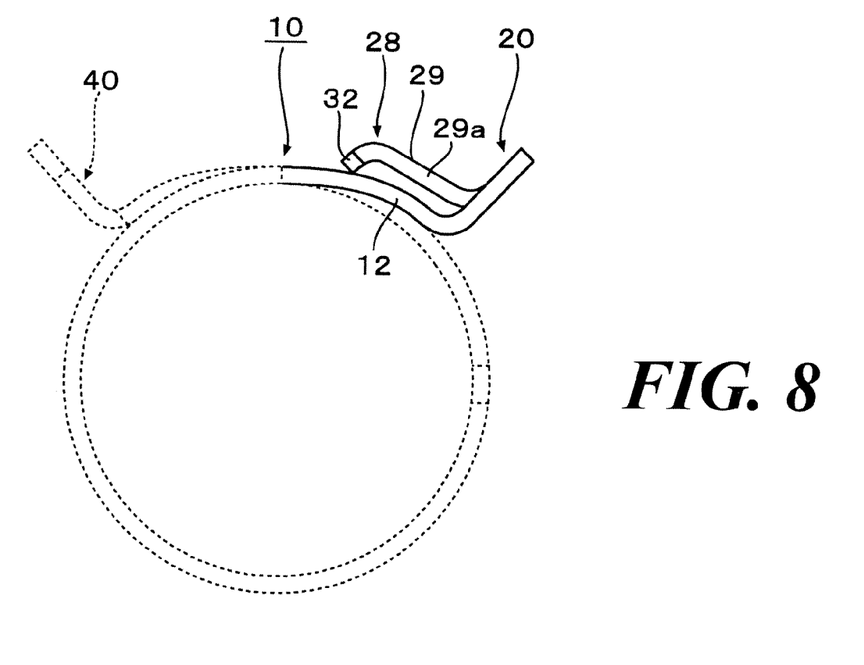
FIG. 8 is a rear view of the hose clamp in the diametrically contracted state.
Figure 9:
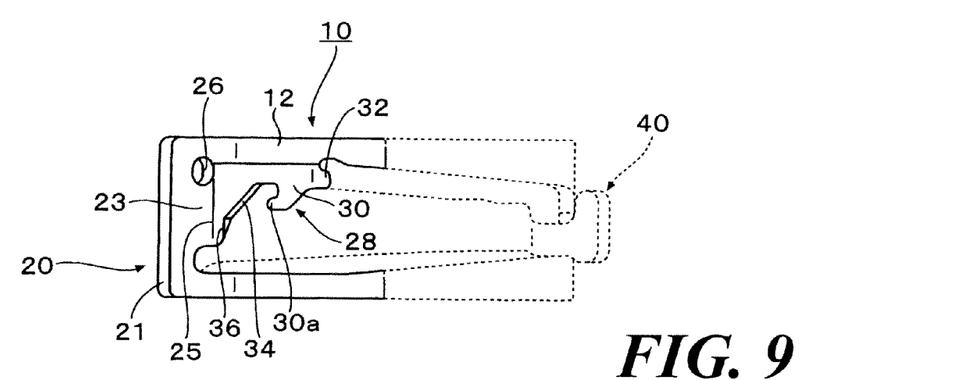
FIG. 9 is a plan view of the hose clamp in the diametrically contracted state.
Figure 10:
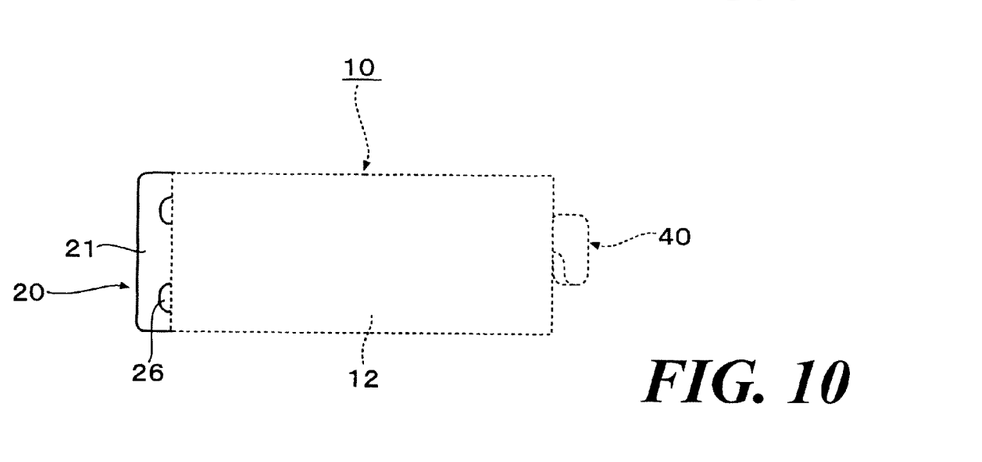
FIG. 10 is a bottom view of the hose clamp in the diametrically contracted state.
Figure 11:
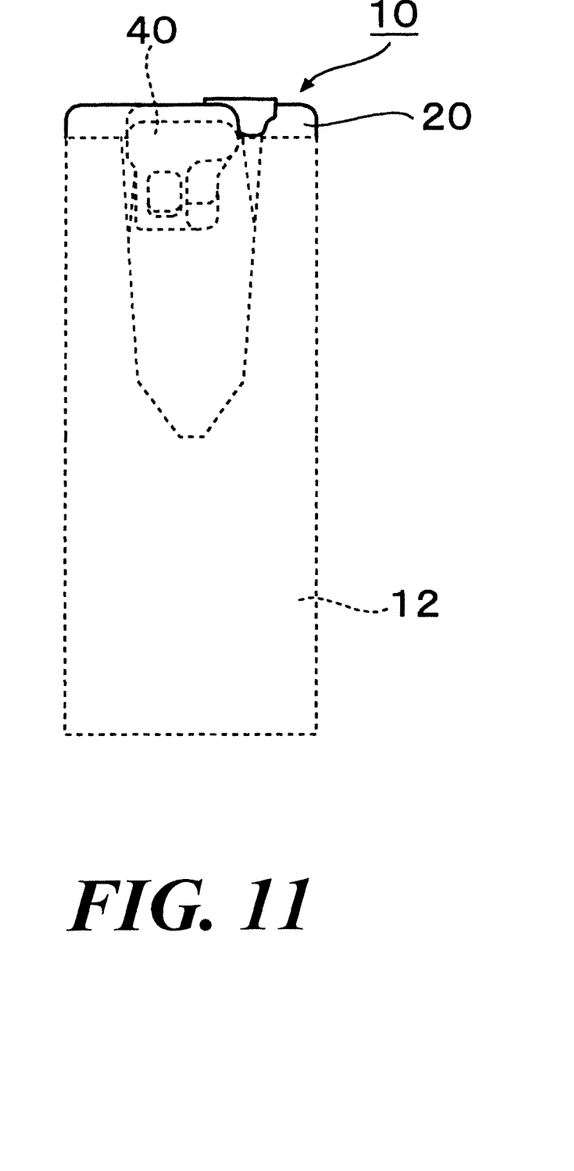
FIG. 11 is a right side view of the hose clamp in the diametrically contracted state.
Figure 12:
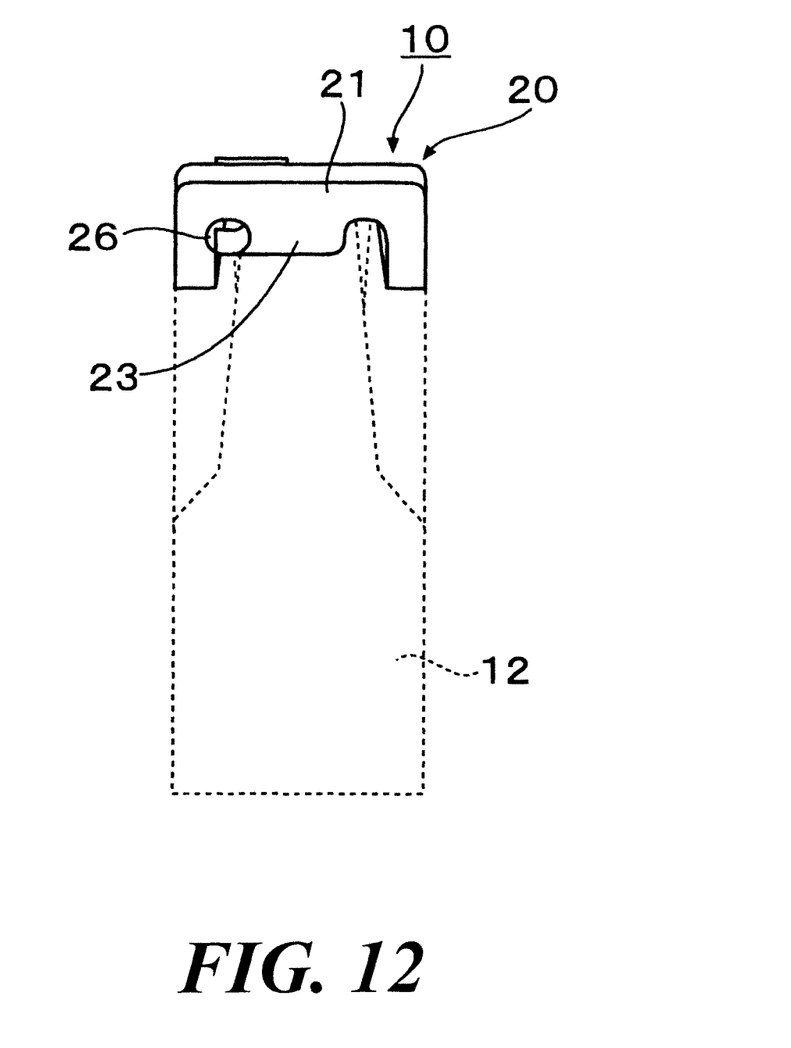
FIG. 12 is a left side view of the hose clamp in the diametrically contracted state.

The stopper portion 36 extends from a distal end of the taper portion 34 near the bent portion 25 so as to be substantially parallel to the first grip piece 20 (refer to FIG. 4A). As shown in FIGS. 6A and 6B, when the second grip piece 40 has moved while being guided by the taper portion 34, the stopper portion 36 abuts the second grip piece 40 to thereby prevent any further movement of the second grip piece 40.

The bending hole 26 is formed in the first grip piece 20 at a position lying further distal than an intersection point A between the side edge 29a of the extending portion 29 (which lies opposite to the side edge where the taper portion 34 is formed) and the stopper 36. By forming the bending hole 26 at such position, the position of the bent portion 25 can be set closer to a proximal end of the locking piece 28 than the stopper portion 36, while preventing the bent portion from being caused at a lengthwise halfway position of the taper portion 34.

In FIG. 6A, an alternate long and short dash line is drawn along the circumferential direction from an intersection point I between the taper portion 34 and the stopper portion 36. As shown in FIG. 6A, the intersection point I between the taper portion 34 and the stopper portion 36 is offset in the width direction relative to the locking portion 30. Because of this, when the second grip piece 40 has moved to abut with the stopper portion 36, the second grip piece 40 is offset in the width direction relative to the locking portion 30 so as not to be engaged with the locking portion 30 again.

A locking projection 30a projects from an extending end of the hook-shaped locking portion 30 towards the bent portion 25, and this locking projection 30a is engaged with a depressed groove-like engagement holding portion 43 of the second grip piece 40. When the plate spring main body 12 is diametrically contracted (the free state), the locking projection 30a is offset in the width direction relative to the engagement holding portion 43 of the second grip piece 40 so as not to overlap therewith in the circumferential direction. By bringing both the grip pieces 20, 40 close in the circumferential direction, and aligning the locking projection 30a with the engagement holding portion 43 while deflecting the plate spring main body 12 in the width direction, the locking projection 30a is engaged with the engagement holding portion 43. Thus, the plate spring main body 12 is held in the diametrically expanded state. From this state, by bringing both the grip pieces 20, 40 further close in the circumferential direction, the locking projection 30a is disengaged from the engagement holding portion 43, and the deflection of the plate spring main body 12 in the width direction is corrected by the elastic force of the plate spring main body 12 itself. In this state, the locking projection 30a and the engagement holding portion 43 do not overlap with each other in the circumferential direction. Thus, by releasing both the grip pieces 20, 40 to move away from each other, the insertion piece 38 slides within the slit 14, and the plate spring main body 12 is diametrically contracted.

A distalmost portion 32 of the locking piece 28 has an arc-like round shape. A lateral side 30c (refer to FIG. 3) of the locking portion 30 which faces the second grip piece 40 is tapered so as to gradually narrow towards the distalmost portion 32. Thus, the locking portion 30 is prevented from interfering with the insertion piece 38 when the plate spring main body 12 is diametrically contracted. A distal end portion of the locking piece 28, including the distalmost portion 32, is bent radially inwards of the plate spring main body 12, so that the distalmost portion 32 of the locking piece 28 is prevented from being gripped with a tool T.

At the other end portion of the plate spring main body 12, the insertion piece 38 is formed. The insertion piece 38 is inserted into the slit 14. The insertion piece 38 slides in the circumferential direction within the slit 14 when the plate spring main body 12 is diametrically expanded or contracted. As shown in FIG. 3, one edge portion 38a of the insertion piece 38 to be faced with the locking piece 28 is cut out to almost reach a center line C of the plate spring main body 12, at a position which lies slightly proximal than a distalmost end of the insertion piece 38. An end portion of the insertion piece 38, including the one edge portion 38a, is bent radially outwards of the plate spring main body 12, thereby forming the second grip piece 40 to be faced with the first grip piece 20.

A projection piece 41 projects from a distal end portion of the second grip piece 40 towards one side of the plate spring main body 12 in the width direction thereof (towards a direction in which the projection piece 41 approaches the locking piece 28). This facilitates the gripping of the second grip piece 40 with a tool such as a pair of pliers or pincers.

As shown in FIGS. 2, 4A and 4B, the engagement holding portion 43 of the depressed groove-like shape is formed on a side (external side) of the second grip piece 40, which is opposite to a side facing the first grip piece 20, by depressing the second grip piece 40 in a thickness direction to a predetermined depth. The locking projection 30a of the locking portion 30 of the locking piece 28 is engaged with an inner circumferential edge of the depressed groove-like engagement holding portion 43, whereby the engagement between the second grip piece 40 and the locking portion 30 is held. The shape of the engagement holding portion 43 is not limited to the depressed groove-like shape. For example, the engagement holding portion 43 may be formed by the projection shape which restricts the movement of the locking portion 30. Thus, any shape may be adopted, as long as the engagement between the second grip piece 40 and the locking portion 30 can be held.

Next, a procedure for fastening a flexible hose H made of a material such as rubber to the pipe P by use of the above-described clamp 10 will be described.

As shown in FIG. 1, from the state where the plate spring main body 12 is diametrically contracted and where the first grip piece 20 and the second grip piece 40 are spaced apart from each other, the first grip piece 20 and the second grip piece 40 are gripped together with the tool T such as a pair of pliers or pincers (refer to FIG. 4B) to bring them close in the circumferential direction against the elastic restoring force of the plate spring main body 12. Then, while deflecting the plate spring main body 12 in the width direction, the locking portion 30 of the locking piece 28 is projected towards the external side of the second grip piece 40, and the locking projection 30a of the locking portion 30 is aligned with the depressed groove-like engagement holding portion 43, so that the locking projection 30a is engaged with the engagement holding portion 43. As a result, the plate spring main body 12 is held in the diametrically expanded state, while the engagement holding portion 43 and the locking projection 30a are engaged and both the end portions of the plate spring main body 12 are deflected in the width direction, as shown in FIG. 2.

In this state, the clamp 10 is disposed on an outer circumference of the hose H which is mounted on an outer circumference of one end portion of the pipe P. Then, as shown in FIG. 4B, the first grip piece 20 and the second grip piece 40 are gripped together with the tool T such as a pair of pliers or pincers to bring both the grip pieces 20, 40 further close to each other in the circumferential direction.

Figure 5A:
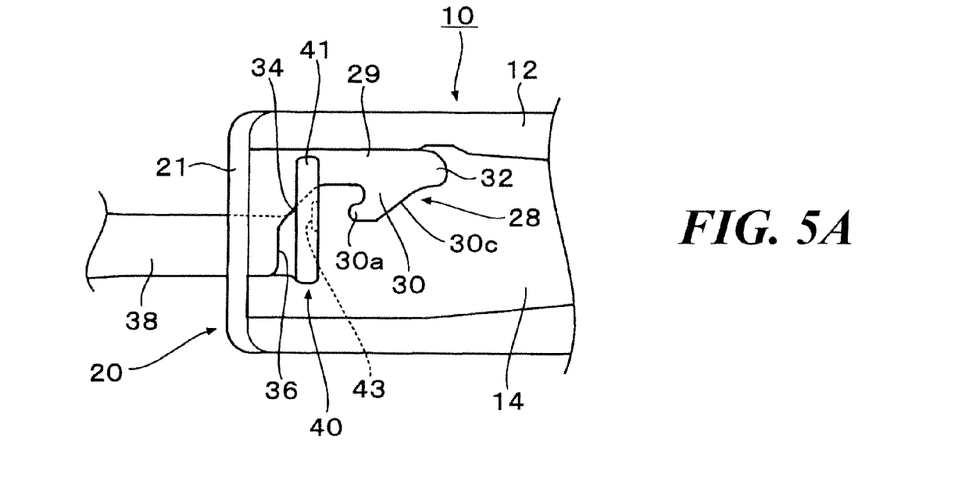
FIGS. 5A and 5B illustrate the hose clamp in a state where a first grip piece and the second grip piece are gripped together by a tool to move the second grip piece along a taper portion, FIG. 5A being an enlarged plan view, FIG. 5B being an enlarged side view.
Figure 5B:
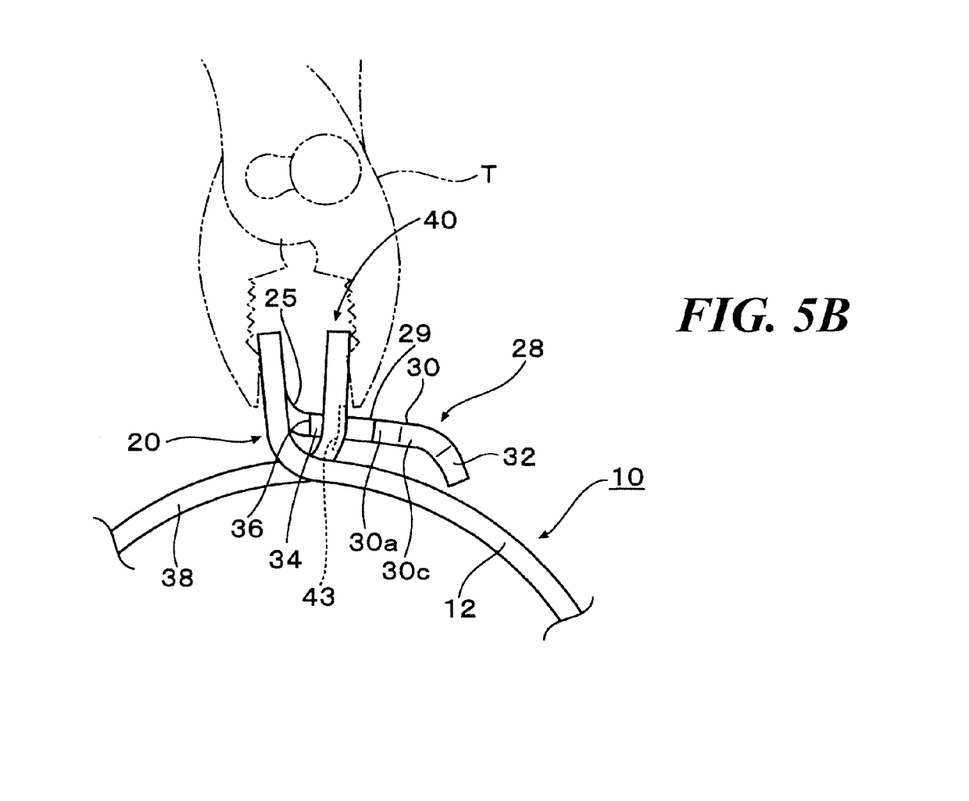

Then, the locking projection 30a is disengaged from the depressed groove-like engagement holding portion 43, and the second grip piece 40 is slidingly guided by the taper portion 34 of the locking piece 28, so that the second grip piece 40 moves in the width direction while moving away from the locking portion 30, as shown in FIGS. 5A and 5B.

When the second grip piece 40 abuts with the stopper portion 36 of the locking piece 28 as shown in FIGS. 6A and 6B, a further movement of the second grip piece 40 towards the first grip portion 20 is prevented. In this state, the intersection point I between the taper portion 34 and the stopper portion 36 is offset in the width direction relative to the locking portion 30, and therefore, the second grip piece 40 can be offset in the width direction relative to the locking portion 30 so as to be surely disengaged from the locking portion 30.

In this state, when the tool T is gradually opened so that the first grip piece 20 and the second grip piece 40 move away from each other, the insertion piece 38 slides within the slit 14 by the elastic restoring force of the plate spring main body 12. As a result, the plate spring main body 12 is diametrically contracted, and the hose H is fastened to be fixed to the pipe P.

In the above-mentioned clamp 10, by simply bringing both the grip pieces 20, 40 close to each other in the circumferential direction from the state where the plate spring main body 12 is diametrically expanded, the second grip piece 40 can surely move to the position where the second grip piece 40 is disengaged from the locking portion 30 while being guided by the taper portion 34, thereby realizing an easy diametrically contracting operation of the plate spring main body 12.

The taper portion 34 is disposed along the plane which is substantially parallel to the circumferential surface of the plate spring main body 12 (refer to FIG. 4B). Therefore, when bringing both the grip pieces 20, 40 close to each other in the circumferential direction, the sliding resistance between the second grip piece 40 and the taper portion 34 is prevented from being increased. Thus, the second grip piece 40 can surely move until abutting with the stopper portion 36 while being guided by the taper portion 34, thereby realizing an easy diametrically contracting operation of the plate spring main body 12.

The stopper portion 36 is provided on the locking piece 28 of the first grip piece 20 so as to be continuous with the taper portion 34. Therefore, when bringing both the grip pieces 20, 40 close to each other to diametrically contract the plate spring main body 12, the second grip piece 40 having been guided by the taper portion 34 abuts with the stopper portion 36, whereby any further movement of the second grip piece 40 is prevented. In this state, the second grip piece 40 is offset in the width direction so as not to be engaged with the locking portion 30 again. Thus, the working person can surely be aware of the final position of gripping by the tool T, whereby he or she can perform the hose clamping operation in an ensured and safe fashion. And, the deformation of the plate spring main body 12 can be prevented which would otherwise occur as a result of excessive gripping by the tool T, thereby maintaining the fastening force applied to the hose H.

As shown in FIGS. 3 and 4A, the taper portion 34 provided on the locking piece 28 forms a smooth plane and extends obliquely as the substantially straight line and obliquely when viewed in the radially inward direction from thereabove. Therefore, the sliding resistance caused when the second grip piece 40 slides on the taper portion 34 can be suppressed.

In this embodiment, as shown in FIGS. 1 to 3, the bending hole 26 is provided in the end portion of the bent portion 25 where the side edge 29a of the extending portion 29 which is opposite to the side edge where the taper portion 34 is formed intersects the bent portion 25. According to this configuration, the locking piece 28 can be easily bent at the position of the bent portion 25, and a curved portion caused when bending the locking piece 28 can be avoided from reaching the taper portion 34. Thus, the taper portion 34 can easily be molded to have the plane shape which is substantially parallel to the circumferential surface of the plate spring main body 12.

DESCRIPTION OF REFERENCE NUMERALS 10 hose clamp (clamp); 12 plate spring main body; 14 slit; 20 first grip piece, 25 bent portion; 26 bending hole; 28 locking piece; 29a side edge; 30 locking portion; 34 taper portion; 36 stopper portion; 38 insertion portion; 40 second grip piece; 43 engagement holding portion.

The invention claimed is:
1. A hose clamp, comprising:
a plate spring main body which is curved into a ring-like shape,
wherein one end portion of the plate spring main body includes:
a slit extending along a circumferential direction; and
a first grip piece projecting radially outwards,
wherein an other end portion of the plate spring main body includes:
an insertion piece which is inserted into the slit so as to be slidable in the circumferential direction therewithin; and
a second grip piece projecting radially outwards from an end portion of the insertion piece so as to face the first grip piece,
wherein the plate spring main body is diametrically contracted when it is in a free state, and by bringing the first grip piece and the second grip piece close to each other from the free state, the plate spring main body is diametrically expanded against an elastic force,
wherein the first grip piece includes a locking piece which extends in the circumferential direction from a projection halfway position of the first grip piece towards the second grip piece via a bent portion, the locking piece including a distal end portion which extends in a hook-like fashion in a width direction of the plate spring main body as a locking portion, the locking portion being engageable with one side of the second grip piece which is opposite to an other side of the second grip piece facing the first grip piece,
wherein the second grip piece includes an engagement holding portion which holds an engagement between the locking portion and the one side of the second grip piece,
wherein the locking portion is offset in the width direction relative to the second grip piece so as not to overlap therewith in the circumferential direction, in the free state where the plate spring main body is diametrically contracted,
wherein one side edge of the locking piece, which faces the second grip piece when the locking portion and the second grip piece are engaged, includes:
a taper portion which extends from the locking portion towards the bent portion while expanding in the width direction of the plate spring main body; and
a stopper portion which extends substantially parallel to the first grip piece from a distal end of the taper portion near the bent portion,
wherein the taper portion is disposed along a plane which is substantially parallel to a circumferential surface of the plate spring main body, and
wherein, when viewed from a direction of a centerline of the plate spring main body, an intersection point of the taper portion and the stopper portion is offset in the width direction of the plate spring main body relative to the locking portion.
2. The hose clamp of claim 1, wherein a bending hole is formed in the first grip piece at a position lying further distal than an intersection point between an other side edge of the first grip piece and the stopper portion, and
wherein the bent portion is provided near the bending hole.
3. The hose clamp of claim 1, wherein, the locking portion is located at a side of a line that passes through the intersection point along the circumferential direction, and the stopper portion is located at another side of the line.
4. The hose clamp of claim 1, wherein, an entirety of the locking portion is located at a side of a line that passes through the intersection point along the circumferential direction, and the stopper portion starts at another side of the line.
5. The hose clamp of claim 1, wherein, when the second grip piece is moved to abut with the stopper portion, the second grip piece is offset in the width direction relative to the locking portion.
6. The hose clamp of claim 5, wherein, when the second grip piece is moved to abut with the stopper portion, the second grip piece is disengaged from the locking portion.
7. The hose clamp of claim 1, wherein, in the plan view, the stopper portion is parallel to an upper wall portion of the first grip piece.
8. The hose clamp of claim 1, wherein, in the plan view, an entirety of the stopper portion is parallel to an upper wall portion of the first grip piece.
9. The hose clamp of claim 1, wherein, an entirety of the taper portion is located at a side of a line that passes through the intersection point along the circumferential direction, and an entirety of the stopper portion is located at another side of the line.
10. The hose clamp of claim 1, wherein, when the second grip piece is moved while being guided by the taper portion, the stopper portion abuts the second grip piece to prevent a movement of the second grip piece.
11. A hose clamp, comprising:
a plate spring main body,
wherein one end portion of the plate spring main body includes:
a slit extending along a circumferential direction; and
a first grip piece projecting radially outwards,
wherein an other end portion of the plate spring main body includes:
an insertion piece which is inserted into the slit; and
a second grip piece projecting radially outwards from an end portion of the insertion piece so as to face the first grip piece,
wherein the plate spring main body is diametrically contracted when the plate spring main body is in a free state, and by bringing the first grip piece and the second grip piece close to each other from the free state,
wherein the first grip piece includes a locking piece which extends in the circumferential direction from the first grip piece towards the second grip piece via a bent portion, the locking piece including a distal end portion which extends in a width direction of the plate spring main body as a locking portion, the locking portion being engageable with one side of the second grip piece,
wherein the second grip piece includes an engagement holding portion which holds an engagement between the locking portion and the one side of the second grip piece,
wherein one side edge of the locking piece, which faces the second grip piece when the locking portion and the second grip piece are engaged, includes:
a taper portion which extends from the locking portion towards the bent portion while extending in the width direction of the plate spring main body; and
a stopper portion which extends substantially parallel to the first grip piece from a distal end of the taper portion, and
wherein, when viewed from a direction of a centerline of the plate spring main body, an intersection point of the taper portion and the stopper portion is offset in the width direction of the plate spring main body relative to the locking portion.

12. The hose clamp of claim 11, wherein the locking portion is offset in the width direction relative to the second grip piece so as not to overlap therewith in the circumferential direction, in the free state where the plate spring main body is diametrically contracted.

13. The hose clamp of claim 11, wherein, the locking portion is located at a side of a line that passes through the intersection point along the circumferential direction, and the stopper portion is located at another side of the line.

14. The hose clamp of claim 11, wherein, an entirety of the locking portion is located at a side of a line that passes through the intersection point along the circumferential direction, and the stopper portion starts at another side of the line.

15. The hose clamp of claim 11, wherein, when the second grip piece is moved to abut with the stopper portion, the second grip piece is offset in the width direction relative to the locking portion.

16. The hose clamp of claim 15, wherein, when the second grip piece is moved to abut with the stopper portion, the second grip piece is disengaged from the locking portion.

17. The hose clamp of claim 11, wherein, in the plan view, the stopper portion is parallel to an upper wall portion of the first grip piece.

18. The hose clamp of claim 11, wherein, in the plan view, an entirety of the stopper portion is parallel to an upper wall portion of the first grip piece.

19. The hose clamp of claim 11, wherein, an entirety of the taper portion is located at a side of a line that passes through the intersection point along the circumferential direction, and an entirety of the stopper portion is located at another side of the line.

20. The hose clamp of claim 11, wherein, when the second grip piece is moved while being guided by the taper portion, the stopper portion abuts the second grip piece to prevent a movement of the second grip piece.

\* \* \* \* \*